(12) United States Patent
Pan et al.

(10) Patent No.: US 9,698,936 B2
(45) Date of Patent: Jul. 4, 2017

(54) CONFIGURATION METHOD, SYSTEM AND DEVICE FOR UPLINK CHANNEL

(75) Inventors: Xueming Pan, Beijing (CN); Guojun Xiao, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 6 days.

(21) Appl. No.: 13/386,424

(22) PCT Filed: Aug. 17, 2010

(86) PCT No.: PCT/CN2010/076063
§ 371 (c)(1),
(2), (4) Date: Jan. 22, 2012

(87) PCT Pub. No.: WO2011/020425
PCT Pub. Date: Feb. 24, 2011

(65) Prior Publication Data
US 2012/0120906 A1    May 17, 2012

(30) Foreign Application Priority Data
Aug. 17, 2009    (CN) .......................... 2009 1 0091281

(51) Int. Cl.
H04W 72/04    (2009.01)
H04W 52/24    (2009.01)
(Continued)

(52) U.S. Cl.
CPC .......... *H04L 1/0026* (2013.01); *H04L 5/0053* (2013.01); *H04L 5/0057* (2013.01); *H04W 48/16* (2013.01); *H04W 72/085* (2013.01)

(58) Field of Classification Search
CPC ............... H04L 1/0026; H04L 1/1854; H04W 72/0413; H04W 72/1284; H04W 72/1278;
(Continued)

(56) References Cited

U.S. PATENT DOCUMENTS

2003/0219037 A1    11/2003   Toskala et al.
2010/0093386 A1*   4/2010    Damnjanovic et al. ...... 455/522
(Continued)

FOREIGN PATENT DOCUMENTS

CN            1810048 A        7/2006

OTHER PUBLICATIONS

3GPP TS 36.213 V8.6.0 (Mar. 2009), 77 Pages.*
(Continued)

*Primary Examiner* — Andrew Chriss
*Assistant Examiner* — Romani Ohri
(74) *Attorney, Agent, or Firm* — Handal & Morofsky, LLC

(57) ABSTRACT

The embodiments of the present invention disclose a configuration method, system and device for an uplink channel. The method includes: The terminal achieve the information the network side device sending of carrying uplink transmission mode, and use the transmission mode transfer uplink signal; the terminal obtains the channel quality information according to the uplink transmission mode; the channel quality information the terminal obtained report to the network side device, as well as enables the network side device configures the uplink channel according to the channel quality information. The present invention performs the configuration of uplink channels in multicarrier transmission.

8 Claims, 7 Drawing Sheets

(51) Int. Cl.
 *H04L 1/00* (2006.01)
 *H04L 5/00* (2006.01)
 H04W 48/16 (2009.01)
 H04W 72/08 (2009.01)
(58) Field of Classification Search
 CPC .. H04W 36/30; H04W 52/365; H04W 52/146
 USPC ................................. 370/252, 329; 455/522
 See application file for complete search history.

(56) References Cited

U.S. PATENT DOCUMENTS

| 2010/0103886 | A1* | 4/2010 | Chun | H04L 1/0028 370/329 |
| 2011/0038271 | A1* | 2/2011 | Shin | H04W 52/146 370/252 |
| 2011/0141941 | A1* | 6/2011 | Lee et al. | 370/252 |
| 2011/0261776 | A1* | 10/2011 | Ahn | H04L 5/0007 370/329 |
| 2012/0106472 | A1* | 5/2012 | Rosa et al. | 370/329 |

OTHER PUBLICATIONS

International Search Report issued International Application No. PCT/CN2010/076063, dated Nov. 18, 2010.
Office Action issued in Chinese Patent Application No. 200910091281.5, dated May 17, 2012.
(English Translation) Office Action issued in Chinese Patent Application No. 200910091281.5, dated May 17, 2012.

* cited by examiner

CONFIGURATION METHOD, SYSTEM AND DEVICE FOR UPLINK CHANNEL

The present application claims the priority of the Chinese patent application:

The Chinese patent application with the application date of Aug. 17, 2009, the application number of 200910091281.5, and the patent name of "configuration method, system and device for uplink channel", all content of the priority application is combined into the present application by quoting.

FIELD OF THE PRESENT INVENTION

The present invention relates to the field of wireless communication technology, and more particularly to configuration method, system and device for uplink channel.

BACKGROUND OF THE PRESENT INVENTION

In the LTE (Long Term Evolution) Rel-8 system, there are two uplink channels, i.e. PUSCH (Physical Uplink Shared Channel) and PUCCH (Physical Uplink Control Channel). PUCCH mainly carries UCI (Uplink Control Information), for HARQ (Hybrid Automatic Retransmission request) feedback information, channel quality feedback information, request scheduling and so on. PUCCH is transmitted in the uplink sub-frame and the both sides of the system bandwidth, as shown in FIG. 1, PUCCH uses code division and/or frequency division to distinguish users. PUSCH mainly carries uplink traffic data. PUSCH is transmitted in the uplink sub-frame and the whole system bandwidth except for bandwidth occupied by PUCCH, as shown in FIG. 1, PUSCH uses frequency division to distinguish users.

LTE REL-8 uplink is designed to follow the strict single carrier characteristics, in which, a UE transmits only one physical channel or signal. Therefore, when a UE have to transmit both PUSCH and PUCCH in a sub-frame, it needs to insert the UCI into uplink packet and transmit it in PUSCH, to ensure the signal carrier characteristic, as shown in the No.2 sub-frame in FIG. 2. In LTE REL-8, independent closed-loop control operations of PUSCH and PUCCH are applied. Because of UE only can send one of the PUSCH and PUCCH in an uplink sub-frame, the closed-loop power control command for PUSCH or PUCCH controls the transmitting power in each sub-frame's. The definition of LTE REL-8 uplink power headroom report (PHR) is as the following. The UE reports to network side device the calculated transmitting power headroom of the current sub-frame, by which the network side device determines the MCS and resource allocations for uplink data scheduling in the next time, to avoid the UE reaches power limitation. PHR is defined as the UE maximum transmitting power minus the transmitting power of PUSCH in sub-frame i:

$$PH(i)=P_{CMAX}-P_{PUSCH}(i) \quad (1)$$

In the process of achieving this present invention, the inventor found that there are following problems of existing technology:

The single carrier characteristic of uplink transmission is relaxed in LTE-Advanced by allow UE transmit PUCCH and PUSCH simultaneously in the same sub-frame, as shown in FIG. 2. However, no specific mechanism to configure the uplink channel transmissions is published, without which, the system cannot work properly.

SUMMARY OF THE PRESENT INVENTION

Embodiments of the present invention provide a kind of method, system and device for an uplink channel configuration, realizing the configuration of uplink channels in case of multicarrier transmission.

Embodiments of the present invention provide a kind of method for an uplink channel configuration, comprising:

The terminal receives the information from the network side device carrying uplink transmission mode, and uses the transmission mode;

The terminal calculates the channel quality information according to the uplink transmission mode;

The terminal reports the calculated channel quality information to the network side device, which enables the network side device to configure the uplink channel according to the channel quality information.

Said the network side device configures the uplink transmission mode of a terminal, comprising:

Said network side device configures the transmission mode of the signal carrier characteristics for the terminal or the said network side device configures the transmission mode of the multicarrier characteristics for the terminal.

The transmission mode of the multicarrier characteristics is that the uplink transmission of the terminal in a sub-frame is PUSCH transmission, or the uplink transmission of the terminal in a sub-frame is PUCCH transmission;

The transmission mode of the multicarrier characteristics is that the uplink transmission of the terminal in a sub-frame is PUSCH transmission, or the uplink transmission of the terminal in a sub-frame is PUCCH transmission, or the uplink transmission of the terminal in a sub-frame is simultaneous transmission of PUSCH and PUCCH.

The terminal calculates the channel quality information according to the uplink transmission mode, comprising:

When the uplink transmission mode is a transmission mode of the single carrier characteristics, the terminal calculates transmitting power headroom through the formula $PH(i)=P_{CMAX}-P_{PUSCH}(i)$, thereinto, $P_{CMAX}$ is the maximum allowed transmission power of UE, $P_{PUSCH}(i)$ is the transmission power of PUSCH in the sub-frame i, PH(i) is the transmitting power headroom.

When the uplink transmission mode is a transmission mode of the multicarrier characteristics, the terminal calculates transmitting power headroom through the formula $PH(i)=P_{CMAX}-P_{PUCCH}(i)$, thereinto, $P_{CMAX}$ is the maximum allowed transmission power of the terminal, $P_{PUSCH}(i)$ is the transmission power of PUSCH in the sub-frame i, $P_{PUCCH}$ is the transmission power of PUCCH in the sub-frame i, PH(i) is the transmitting power headroom.

Embodiments of the present invention provide a kind of method for an uplink channel configuration, comprising:

A network side device configures the uplink transmission mode of a terminal as well as enables the terminal to transmit uplink channels using the configured uplink transmission mode, to calculate the channel quality information according to the configured uplink transmission mode, and report it to the network side device; The transmission mode is a transmission mode of the single carrier characteristics or the multicarrier characteristics.

The network side device receives the channel quality information reported by the terminal;

The network side device configures the uplink channel according to the channel quality information.

Said the network side device configures the uplink transmission mode of a terminal, comprising:

Said network side device configures the transmission mode of the signal carrier characteristics for the terminal or the said network side device configures the transmission mode of the multicarrier characteristics for the terminal.

The transmission mode of the signal carrier characteristics is that the uplink transmission of the terminal in a sub-frame is PUSCH transmission, or the uplink transmission of the terminal in a sub-frame is PUCCH transmission;

The transmission mode of the multicarrier characteristics is that the uplink transmission of the terminal in a sub-frame is PUSCH transmission, or the uplink transmission of the terminal in a sub-frame is PUCCH transmission, or the uplink transmission of the terminal in a sub-frame is simultaneous transmission of PUSCH and PUCCH.

Before said network side device configures the uplink transmission mode of a terminal, comprising:

The said network side device receives the channel quality information reported by the terminal; or The network side device completes the terminal accessing.

The terminal calculates the transmit power headroom according to the uplink transmission mode the channel quality information for the said terminal according to the uplink transmission mode, comprising:

When the unlink transmission mode is a transmission mode of the single carrier characteristics, the terminal calculates transmitting power headroom through the formula $PH(i)=P_{CMAX}-P_{PUSCH}(i)$, thereinto, $P_{CMAX}$ is the maximum allowed transmission power of the terminal, $P_{PUSCH}(i)$ is the transmission power of PUSCH in the sub-frame i, PH (i) is the transmitting power headroom.

When the uplink transmission mode is a transmission mode of the multicarrier characteristics, the terminal calculates transmitting power headroom through the formula $PH(i)=P_{CMAX}-P_{PUSCH}(i)$, thereinto, $P_{CMAX}$ is the maximum allowed transmission power of the terminal, $P_{PUSCH}(i)$ is the transmission power of PUSCH in the sub-frame i, $P_{PUCCH}$ is the transmission power of PUCCH in the sub-frame i, PH(i) is the transmitting power headroom.

The network side device configures the uplink channel according to the channel quality information is that the network side device configures the uplink transmission mode according to the channel quality information, comprising:

The network side device set transmitting power headroom threshold.

The network side device configures the uplink transmission mode according to the relationship of the power headroom of the terminal reported and the preset transmitting power headroom thresholds;

The network side device judges whether the said uplink transmission mode is the same as the current uplink transmission mode used of the terminal;

The network side device processes according to the judgment.

Embodiments of the present invention further provide a kind of system for an uplink channel configuration, comprising:

The network side device, which is used for configuring the uplink transmission mode of the terminal, the transmission mode is a transmission mode of the single carrier characteristics or the multicarrier characteristics; when the uplink transmission mode is different from the current transmission mode used by the terminal, the network side device transmits the message carrying the reconfiguration of the transmission mode to the terminal, which enables the terminal to transmit uplink channel according to the configured transmission mode and calculates and reports the channel quality information to the network side device; the network side device receives the channel quality information reported by the terminal, and configures the uplink channel according to the channel quality information.

The terminal, receives the information of the uplink transmission mode from the network side device and uses of the transmission mode; calculates the channel quality information according to the uplink transmission mode, and report it to the network side device, which enables the network side device to configure the uplink channel according to the channel quality information.

Embodiments of the present invention provide a kind of network side device, comprising:

Configuration module, which is used for configuring the uplink transmission mode of the terminal, the transmission mode is transmission mode of the single carrier characteristics or the multicarrier characteristics; configuration module configures the uplink channel according to the channel quality information;

Transmitting module, which is used when the uplink transmission mode configured by the configuration module is different from the current transmission mode used by the terminal, to transmit the message carrying the uplink transmission mode, to the terminal, which enables the terminal to transmit the uplink channels using the configured uplink transmission mode, to calculate the channel quality information according to the uplink transmission mode, and to report it to the network side device;

Receiving module, which is used for receiving the channel quality information reported by the terminal, and convey it to the configuration module.

The said configuration module is used for: configuring the transmission mode of the signal carrier characteristics for the terminal or configuring the transmission mode of the multicarrier characteristics for the terminal.

The transmission mode of the signal carrier characteristics is that the terminal's uplink transmission in a sub-frame is PUSCH transmission, or the terminal uplink transmission in a sub-frame is PUCCH transmission;

The transmission mode of the multicarrier characteristics is that the terminal's uplink transmission in a sub-frame is PUSCH transmission, or the terminal's uplink transmission in a sub-frame is PUCCH transmission, or the terminal uplink transmission in a sub-frame is simultaneous transmission of PUSCH and PUCCH.

The behavior of the configuration module before the said network side device configures the uplink transmission mode of a terminal, comprising:

The said network side device receives the channel quality information reported by the terminal; or The network side device completes the terminal accessing.

The said configuration modules, comprising:

Setting sub-module, used for setting the transmitting power headroom thresholds;

Configuration sub-module, used for configuring the uplink transmission mode according to the relationship of the power headroom reported by the terminal and the transmitting power headroom threshold the setting sub-module set;

Judgment sub-module, used for judging, whether the uplink transmission mode configured by the configuration sub-module is the same as the current uplink transmission mode used by the terminal;

Processing sub-module, process according to the judgment made by the judgment sub-module.

Embodiments of the present invention provide a kind of terminal, comprising:

Receiving module, used for receiving the information sent by the network side device carrying uplink transmission mode, and using the transmission mode, the transmission mode is a transmission mode of the single carrier characteristics or the multicarrier characteristics;

Calculating module, used for calculating the channel quality information according to the uplink transmission mode the Receiving module received;

Report module, used for reporting the channel quality information calculated by the calculating module to the network side device which enables the network side device configures the uplink channel according to the channel quality information.

Said the network side device configures the uplink transmission mode of a terminal, comprising:

Said network side device configures the transmission mode of the signal carrier characteristics for the terminal or the said network side device configures the transmission mode of the multicarrier characteristics for the terminal.

The transmission mode of the signal carrier characteristics is that the uplink transmission of the terminal in a sub-frame is PUSCH transmission, or the uplink transmission of the terminal in a sub-frame is PUCCH transmission;

The transmission mode of the multicarrier characteristics is that the uplink transmission of the terminal in a sub-frame is PUSCH transmission, or the uplink transmission of the terminal in a sub-frame is PUCCH transmission, or the uplink transmission of the terminal in a sub-frame is simultaneous transmission of PUSCH and PUCCH.

Said report module, comprising:

When the uplink transmission mode is a transmission mode of the single carrier characteristics, the said calculating module calculates the transmit power headroom through the formula $PH(i)=P_{CMAX}-P_{PUSCH}(i)$, thereinto, $P_{CMAX}$ is the maximum allowed transmission power, $P_{PUSCH}(i)$ is the transmission power of PUSCH in the sub-frame i, PH(i) is the transmitting power headroom.

When the uplink transmission mode is a transmission mode of the multicarrier characteristics, the said calculating module calculates the transmit power headroom through the formula $PH(i)=P_{CMAX}-P_{PUSCH}(i)-P_{PUCCH}(i)$, thereinto, $P_{CMAX}$ is the maximum allowed transmission power, $P_{PUSCH}(i)$ is the transmission power of PUSCH in the sub-frame i, $P_{PUCCH}$ is the transmission power of PUCCH in the sub-frame i, PH(i) is the transmitting power headroom.

Embodiments of the present invention is for power control according to different uplink transmission mode, thus realizes the uplink channel configuration the multicarrier transmitted in LTE-Advanced system. Of course, any product embodied the embodiments of the present invention is not necessary achieving all of the above advantages at the same time.

DETAILED DESCRIPTION OF THE EMBODIMENTS OF THE PRESENT INVENTION

To solve the problems the present technology exists, in embodiment of the present invention, the terminal receives the information sent by the network side device carrying uplink transmission mode, and uses the transmission mode to transmit uplink signal; the terminal calculates the channel quality information according to the uplink transmission mode; the channel quality information the terminal calculated is reported to the network side device, which enables the network side device to configure the uplink channel according to the channel quality information.

In the following parts, clear and complete descriptions of the technology programs of the present invention are made combined with drawings of the embodiments. It is clear that the embodiments of the present invention described here are only parts of the embodiments of the present invention. According to the embodiments of the present invention, any other embodiments made by technical personnel of the field in the absence of creative work are all belong to the scope of the patent protection of the invention.

A network side device includes cell, Node B, eNB and other entity, but not restricted, every device that have the similar function as a network side device are belonged to the invention of the scope of protection. In embodiments of the present invention, the network side device is the base station as an example to explain.

Figure 1:
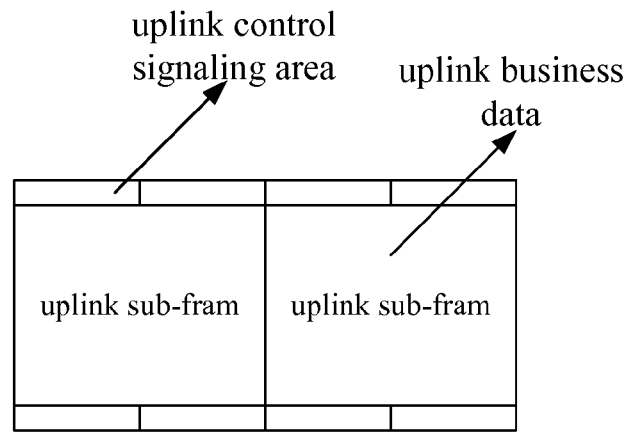
FIG. 1 is a structure of LTE Rel-8 uplink channels of the present technology.
Figure 2:
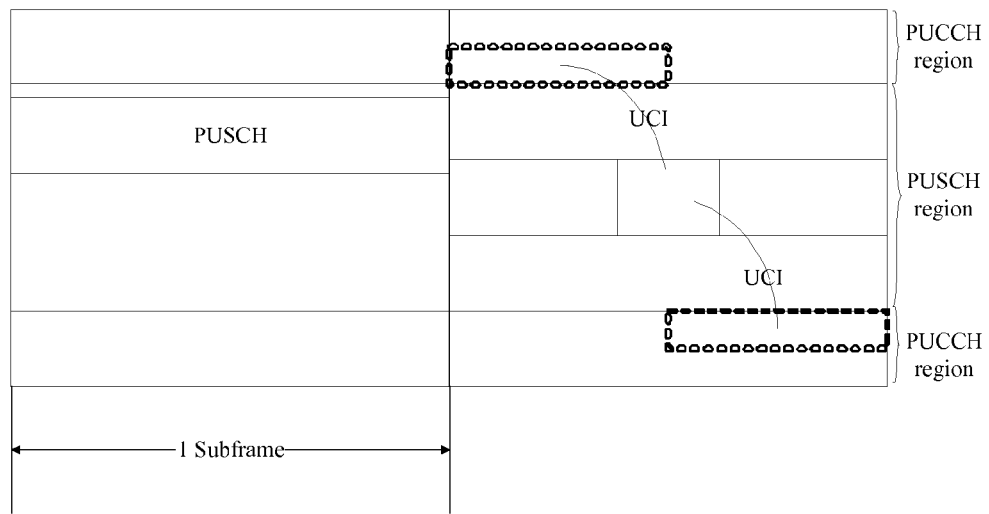
FIG. 2 is an illustration of inserting UCIs into the PUSCH of the present technology.
Figure 3:
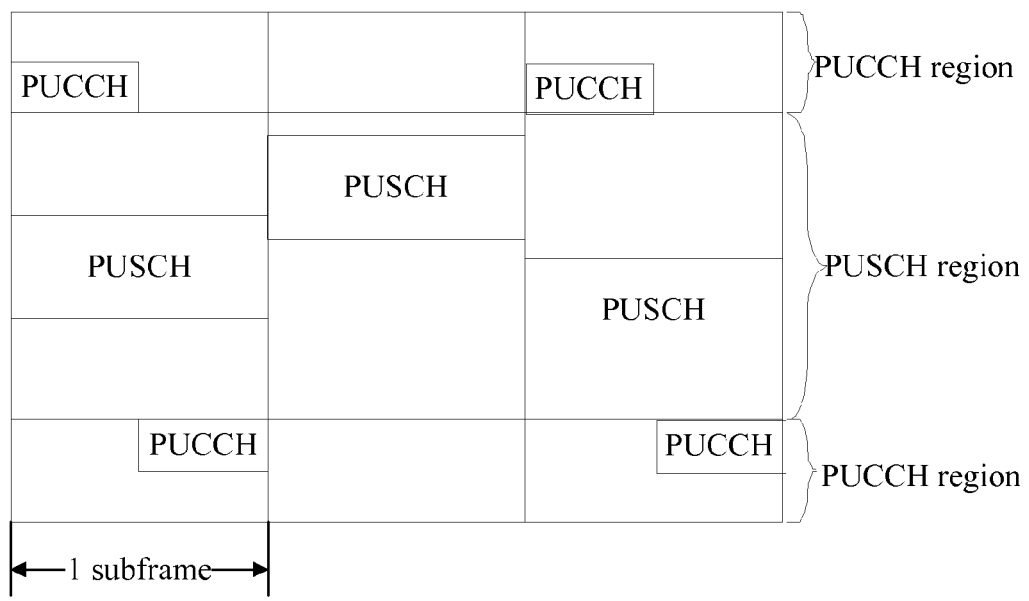
FIG. 3 is an illustration of simultaneous transmission of PUSCH and PUCCH of the present technology.
Figure 4:
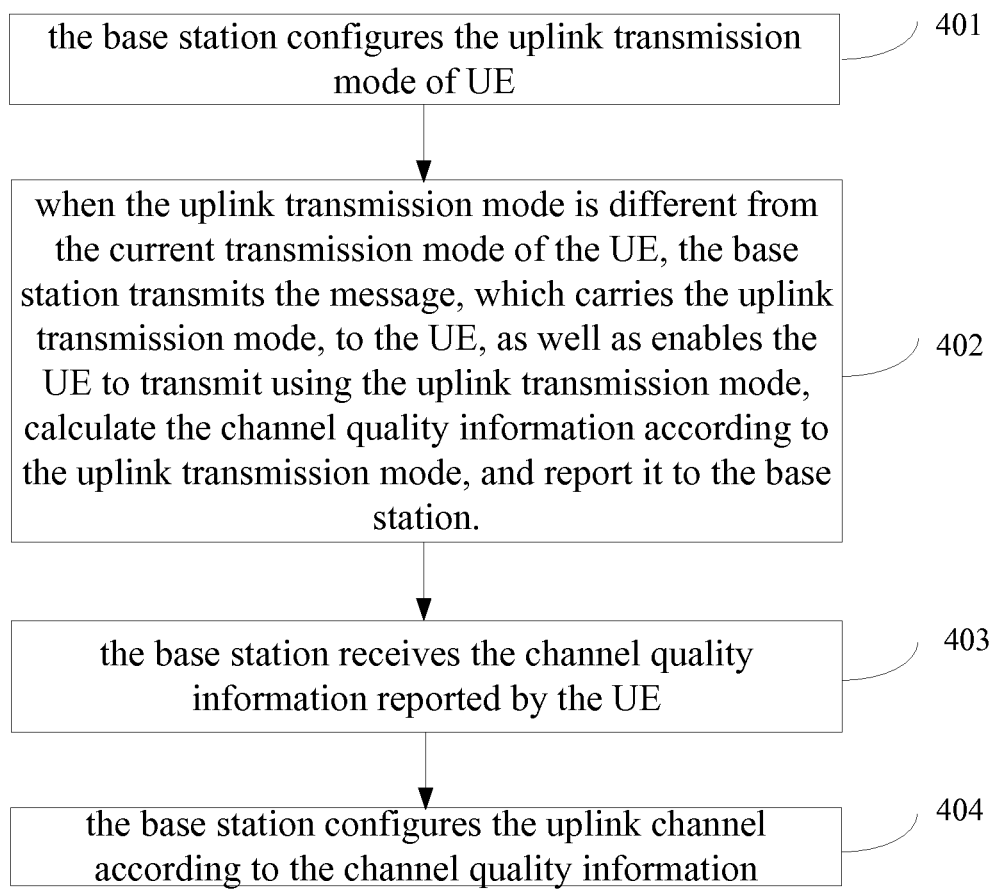
FIG. 4 is a flow diagram of a method for uplink channel configuration of Embodiment of the present invention.

Embodiments of the present invention provide a kind of method for an uplink channel configuration, as shown in FIG. 4, including the following steps:

Step 401, the base station configures the uplink transmission mode of UE.

Step 402, when the uplink transmission mode is different from the current transmission mode of the UE, the base station transmits the message, which carries the uplink transmission mode, to the UE, as well as enables the UE to transmit using the uplink transmission mode, calculate the channel quality information according to the uplink transmission mode, and report it to the base station.

Figure 5:
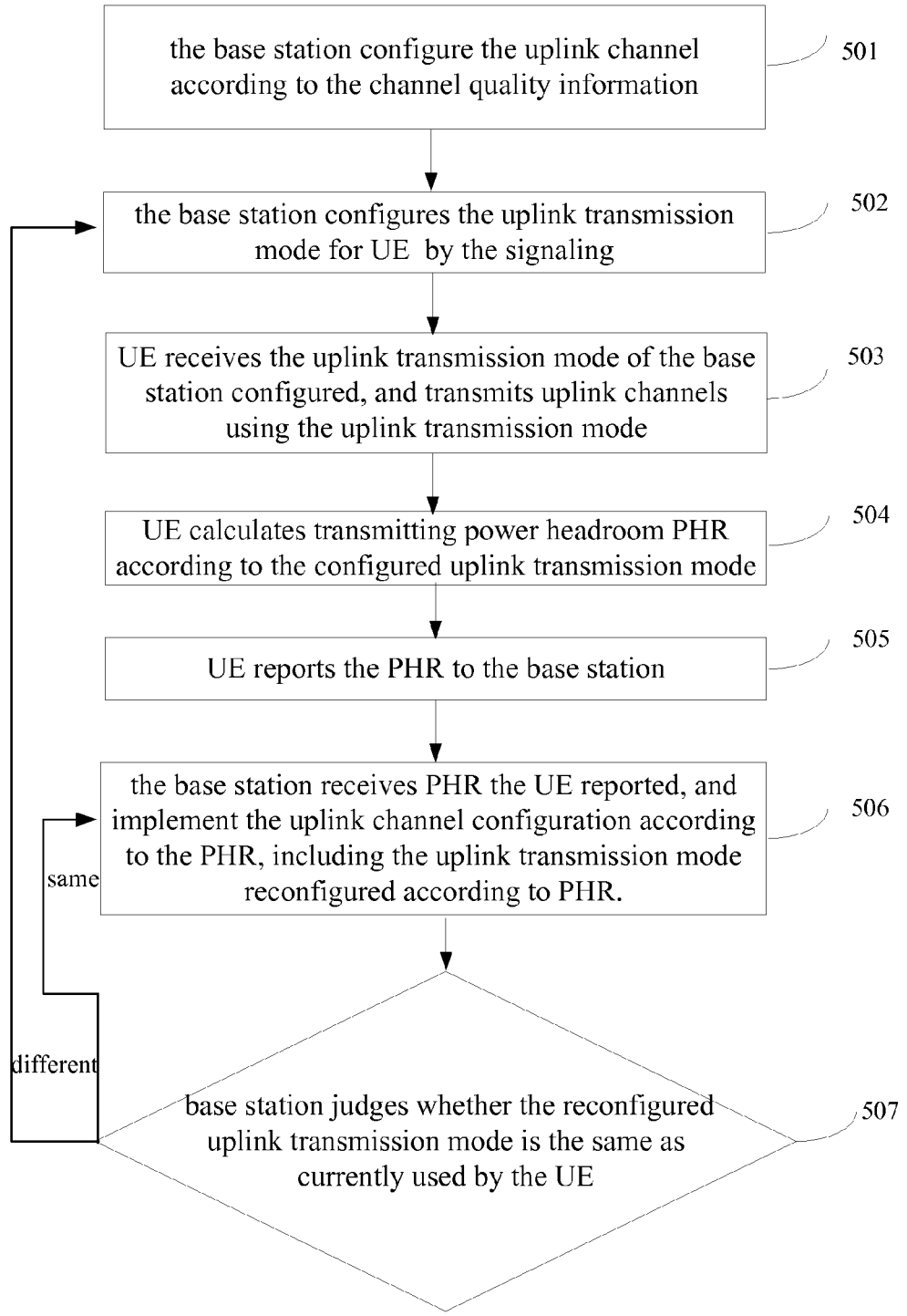
FIG. 5 is a flow diagram of a method for uplink channel configuration of further embodiment of the present invention.

Step 403, the base station receives the channel quality information reported by the UE;

Step 404, the base station configures the uplink channel according to the channel quality information Embodiments of the present invention further provide a kind of method for an uplink channel configuration, as shown in FIG. 5, including the following steps:

Step 501, the base station configure the uplink channel according to the channel quality information.

The uplink transmission mode includes the following:

One of the uplink transmission mode: The uplink transmission mode of UE has the single carrier characteristics.

The uplink transmission of UE in a sub-frame is PUSCH or PUCCH transmission. When the two needs for data transmission at the same time, the UCIs to be transmitted in PUCCH has to be inserted into the PUSCH for transmission.

The other uplink transmission mode of UE has the multicarrier carrier characteristics.

The uplink transmission of the UE in a sub-frame can be simultaneous transmission of PUSCH and PUCCH. Of course, it can also be PUCCH or PUSCH only transmissions.

Because the terminal power consumption with uplink transmission mode 1 is less than the uplink transmission mode 2, optimally, the base station configures the uplink transmission mode 1 for the terminal, at the same time the base station uses independent closed-loop power control to the PUSCH and PUCCH.

Step 502, the base station configures the uplink transmission mode for UE by the signaling.

Optimally, the base station configures the UE by higher layer signaling, e.g. RRC or MAC signalings.

Step 503, UE receives the uplink transmission mode the base station configured, and transmits uplink channels using the uplink transmission mode.

Step 504, UE calculates transmitting power headroom PHR according to the configured uplink transmission mode.

When UE transmits uplink channels by using the uplink transmission mode 1, the base station applies independent closed-loop power control to the PUSCH and PUCCH, the PHR formula is:

$$PH(i)=P_{CMAX}-P_{PUSCH}(i) \qquad (2)$$

Thereinto, $P_{CMAX}$ is the maximum allowed transmission power of UE, $P_{PUSCH}(i)$ is the transmission power of PUSCH in the sub-frame i. PH(i) is the transmitting power headroom, the difference of $P_{CMAX}$ and $P_{PUSCH}(i)$ in value, i.e. the PHR the UE reported to the base station.

When UE transmits uplink channels by using the uplink transmission mode 2, the base station applies independent closed-loop power control to the PUSCH and PUCCH, PHR formula:

$$PH(i)=P_{CMAX}-P_{PUSCH}(i)-P_{PUCCH}(i) \qquad (3)$$

Thereinto, $P_{CMAX}$ is the maximum allowed transmission power of UE, $P_{PUSCH}(i)$ is the transmission power of PUSCH in the sub-frame i, $P_{PUCCH}$ is the transmission power of PUCCH in the sub-frame I, PH(i) is the transmitting power headroom, the difference of $P_{CMAX}$ and $P_{PUSCH}(i)$ in value, i.e. the PHR the UE reported to the base station. Now, when the uplink transmission of the UE in the sub-frame is only in PUSCH, the $P_{PUCCH}(i)$ is zero in formula 3.

Step 505, UE reports the PHR to the base station.

Step 506, the base station receives PHR the UE reported, and implement the uplink channel configuration according to the PHR, including the uplink transmission mode reconfigured according to PHR.

Since more transmitting power is required for the UE when higher MCS level or more physical resources is scheduled by the base station. So the base station can decide the MCS and resource allocation of the next uplink data scheduling according to the PHR the UE reported, in order to avoid the transmitting power of the UE achieving the power limitation.

The base station has two methods to reconfigure the uplink transmission mode according to the PHR. One is that the base station set up a PHR threshold PHR_thr, and configures uplink transmission mode according to the relationship of the PHR the UE reported and the threshold PHR_thr; the other is the base station set up two PHR thresholds PHR_thr1 and PHR_thr2, including PHR_thr1<PHR_thr2, and configures uplink transmission mode according to the relationship of the PHR the UE reported and the threshold PHR_thr1 or PHR_thr2.

In embodiments of the present invention, the base station uses the method 1 to reconfigure the uplink transmission mode as an example to explain.

Especially, the base station using method 1 to reconfigure the uplink transmission mode includes the following steps:

(1) The base station set up the PHR threshold PHR_thr, the setting of PHR_thr can be based on the simulation results or the actual test.

(2) The base station reconfigure the uplink transmission mode according to the relationship of the PHR the UE reported and the threshold PHR_thr.

When the PHR the UE reported is larger than the threshold PHR_thr, the base station configures uplink transmission mode 2 for the UE;

When the PHR the UE reported is less than the threshold PHR_thr, the base station configures uplink transmission mode 1 for the UE.

The judgment above shows that, when the PHR the UE reported is larger than the threshold PHR_thr, the transmission power of PUSCH quite low, the base station therefore configures the UE with uplink transmission mode 2; when the PHR the UE reported is less than the threshold PHR_thr, the transmission power of PUSCH is high, the base station therefore configures the UE with uplink transmission mode 1.

The PHR the UE reported may be a sub-frame instantaneous PHR, or may be the PHR smoothed for a period of time before reported.

Step 507, base station judges whether the reconfigured uplink transmission mode is the same as currently used by the UE.

When the judgment result is the same, the base station will not reconfigures the uplink transmission mode for the UE by signaling, turn to step 506.

When the judgment result is different, the base station reconfigure uplink transmission mode for the UE by signaling, UE then switch to the base station configured uplink transmission mode, turn to step 502.

The two processes above, i.e. uplink transmission mode configuration and calculation of PHR, are complementary. When the base station configures the UE uplink transmission mode, then UE calculates PHR according to the configured uplink transmission mode; When UE finish calculation PHR, the base station configures the UE transmission mode according to obtained PHR. At the first time the UE access, the base station configures uplink transmission mode for UE, optimally, the base station configures uplink transmission mode 1 for the UE.

In embodiments of the present invention include configuring the UE uplink transmission mode according to transmitting power headroom by the base station, but not limited to this. Any parameter that can illustrate the channel quality can be used to configure uplink transmission mode. Furthermore, the base station can not only configure uplink transmission mode, but also do other channel configuration according to the channel quality parameters.

Figure 6:
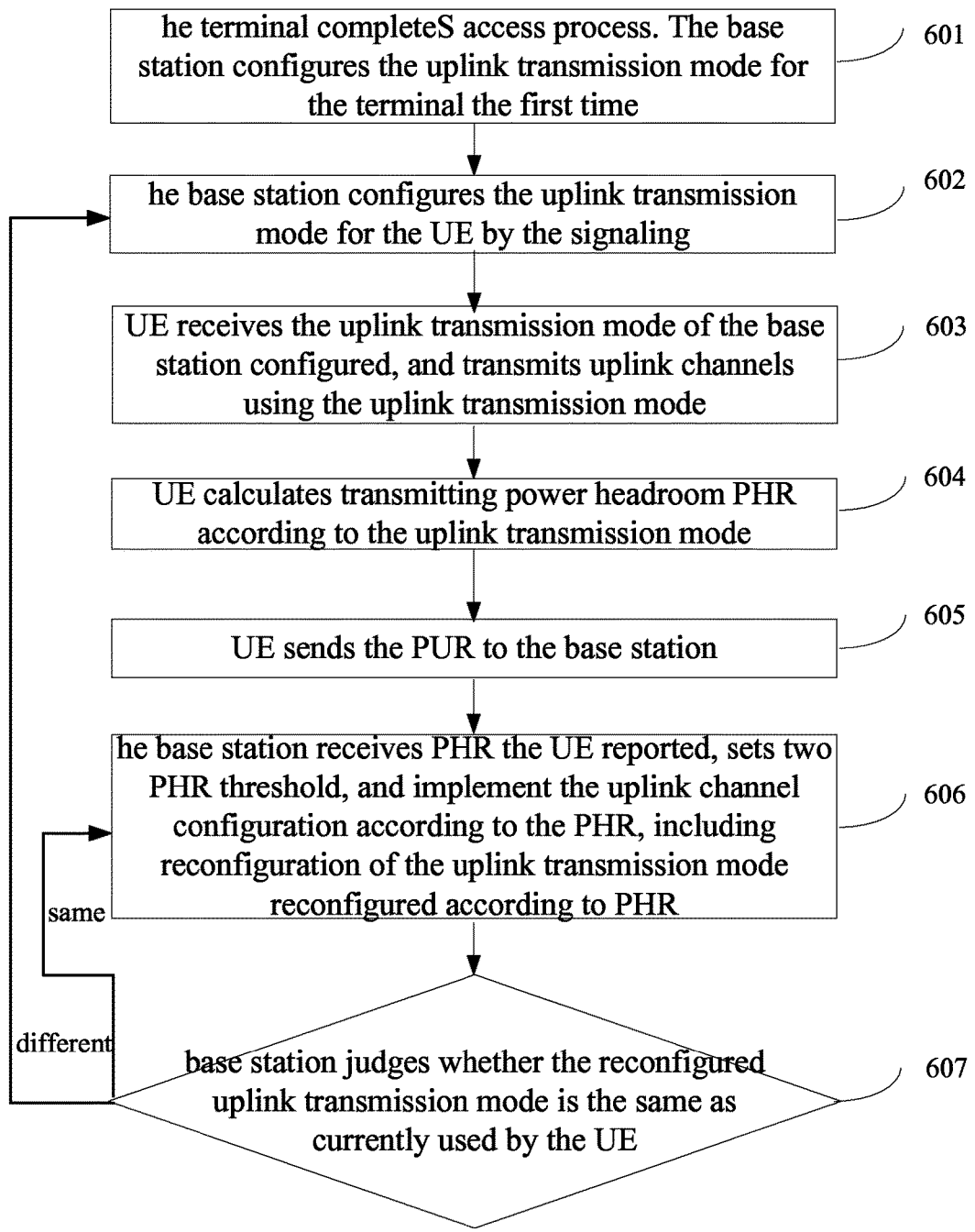
FIG. 6 is a flow diagram of a method for uplink channel configuration of further embodiment of the present invention.

Embodiments of the present invention further provide a kind of method for an uplink channel configuration, as shown in FIG. 6, including the following steps:

Step 601, the terminal completes access process. The base station configures the uplink transmission mode for the terminal the first time.

The uplink transmission mode includes the following two:

One of the uplink transmission mode: The uplink transmission mode of UE has the single carrier characteristics.

The uplink transmission of UE in a sub-frame is PUSCH or PUCCH. When both of them have to be transmitted, the UCIs on PUCCH will be inserted into the PUSCH for transmission.

The other uplink transmission mode of UE has the multicarrier characteristics.

The uplink transmission of the UE in a sub-frame can be PUSCH and PUCCH at the same time. Of course, it can be possible that only one of the two is transmitted in a sub-frame.

Because the power the uplink transmission mode 1 used by the terminal is less than that with the uplink transmission mode 2, optimally, the base station configures the uplink transmission mode 1 for the terminal, at the same time the base station uses independent closed-loop power control to the PUSCH and PUCCH.

Step 602, the base station configures the uplink transmission mode for the UE by the signaling.

Optimized, the base station signals the UE by higher layer signaling, i.e. RRC or MAC.

Step 603, UE receives the uplink transmission mode of the base station configured, and transmits uplink channels using the uplink transmission mode.

Step 604, UE calculates transmitting power headroom PHR according to the uplink transmission mode.

When UE transmits uplink channels with uplink transmission mode 1, the base station uses independent closed-loop power control to the PUSCH and PUCCH, PHR formula is:

$$PH(i)=P_{CMAX}-P_{PUSCH}(i) \quad (1)$$

Thereinto, $P_{CMAX}$ is the maximum allowed transmission power of UE, the base station uses independent closed-loop control to the PUSCH and PUCCH, $P_{PUSCH}(i)$ is the transmission power of PUSCH in the sub-frame i. PH(i) is the transmitting power headroom, the difference of $P_{CMAX}$ and $P_{PUSCH}(i)$ in value, i.e. the PHR the UE reported to the base station.

When UE implement the uplink transfer by using the uplink transmission mode 2, the PHR formula is:

$$PH(i)=P_{CMAX}-P_{PUSCH}(i)-P_{PUCCH}(i) \quad (2)$$

Thereinto, $P_{CMAX}$ is the maximum allowed transmission power of UE, $P_{PUSCH}(i)$ is the transmission power of PUSCH in the sub-frame i, $P_{PUCCH}$ is the transmission power of PUCCH in the sub-frame i, PH(i) is the transmitting power headroom, the difference of $P_{CMAX}$ and $P_{PUSCH}$ (i) in value, i.e. the PHR the UE reported to the base station. Now, when the uplink transmission of the UE in the sub-frame is only in PUSCH, the $P_{PUCCH}(i)$ is zero in formula 2.

Step 605, UE sends the PHR to the base station.

Step 606, the base station receives PHR the UE reported, sets two PHR threshold, and implement the uplink channel configuration according to the PHR, including reconfiguration of the uplink transmission mode according to PHR.

Since more transmitting power is required for the UE when higher MCS level or more physical resources is scheduled by the base station. So the base station can decide the MCS and resource allocation of the next uplink data scheduling according to the PHR the UE reported, in order to avoid the the transmitting power of the UE achiving the power limitation.

The base station has two methods to reconfigure the uplink transmission mode according to the PHR. One is that the base station set up a PHR threshold PHR_thr, and configures uplink transmission mode according to the relationship of the PHR the UE reported and the threshold PHR_thr; the other is the base station set up two PHR thresholds PHR_thr1 and PHR_thr2, including PHR_thr1<PHR_thr2, and configures uplink transmission mode according to the relationship of the PHR the UE reported and the threshold PHR_thr1 or PHR_thr2.

(1) In embodiments of the present invention, the base station uses the method 2 to reconfigure the uplink transmission mode as an example to explain.

Especially, the base station using method 2 includes the following steps to reconfigure the uplink transmission mode:

(1) The base station sets up the PHR threshold PHR_thr1 and PHR_thr2, the setting of PHR_thr1 and PHR_thr2 can be based on the simulation results or the actual test.

(2) The base station reconfigures the uplink transmission mode according to the relationship of the PHR the UE reported and the threshold PHR_thr1 and PHR_thr2.

When the PHR the UE reported is larger than the threshold PHR_thr, the base station configures uplink transmission mode 2 for the UE;

When the PHR the UE reported is less than the threshold PHR_thr, the base station configures uplink transmission mode 1 for the UE.

The judgment above shows that, when the PHR the UE reported is larger than the threshold PHR_thr, the transmission power of PUSCH quite low, the base station therefore configures the UE with uplink transmission mode 2; when the PHR the UE reported is less than the threshold PHR_thr, the transmission power of PUSCH is high, the base station therefore configures the UE with uplink transmission mode 1.

Besides, due to the two PHR thresholds, frequent switching between the two uplink transmission modes can be avoided.

The PHR the UE reported may be a sub-frame instantaneous PHR, or may be the PHR smoothed for a period of time before reported.

Step 507, base station judges whether the reconfigured uplink transmission mode is the same as currently used by the UE.

When the judgment result is the same, the base station will not reconfigures the uplink transmission mode for the UE by signaling, turn to step 606.

When the judgment result is different, the base station reconfigure uplink transmission mode for the UE by signaling, UE then switch to the base station configured uplink transmission mode, turn to step 602.

The two processes above, i.e. uplink transmission mode configuration and calculation of PHR, are complementary. When the base station configures the UE uplink transmission mode, then UE calculates PHR according to the configured uplink transmission mode; When UE finish calculation PHR, the base station configures the UE transmission mode according to obtained PHR. At the first time the UE access, the base station configures uplink transmission mode for UE, optimally, the base station configures uplink transmission mode 1 for the UE.

In embodiments of the present invention include configuring the UE uplink transmission mode according to transmitting power headroom by the base station, but not limited to this. Any parameter that can illustrate the channel quality can be used to configure uplink transmission mode. Furthermore, the base station can not only configure uplink transmission mode, but also do other channel configuration according to the channel quality parameters.

Embodiments of the present invention further provide a kind of system for an uplink channel configuration, comprising:

The base station, which use for configuring the uplink transmission mode of the UE, the transmission mode is a transmission mode of the single carrier characteristics or the multicarrier characteristics; when the uplink transmission mode is different from the current transmission mode of the UE, the network side device transmits the message to the UE; the base station receives the channel quality information reported by the UE, and configures the uplink channel according to the channel quality information.

The UE, receive the information of the uplink transmission mode by the base station transmitting and uses the transmission mode; and calculates the channel quality information according to the uplink transmission mode, and report it to the network side device, which enables the base station configure the uplink channel according to the channel quality information.

Figure 7:
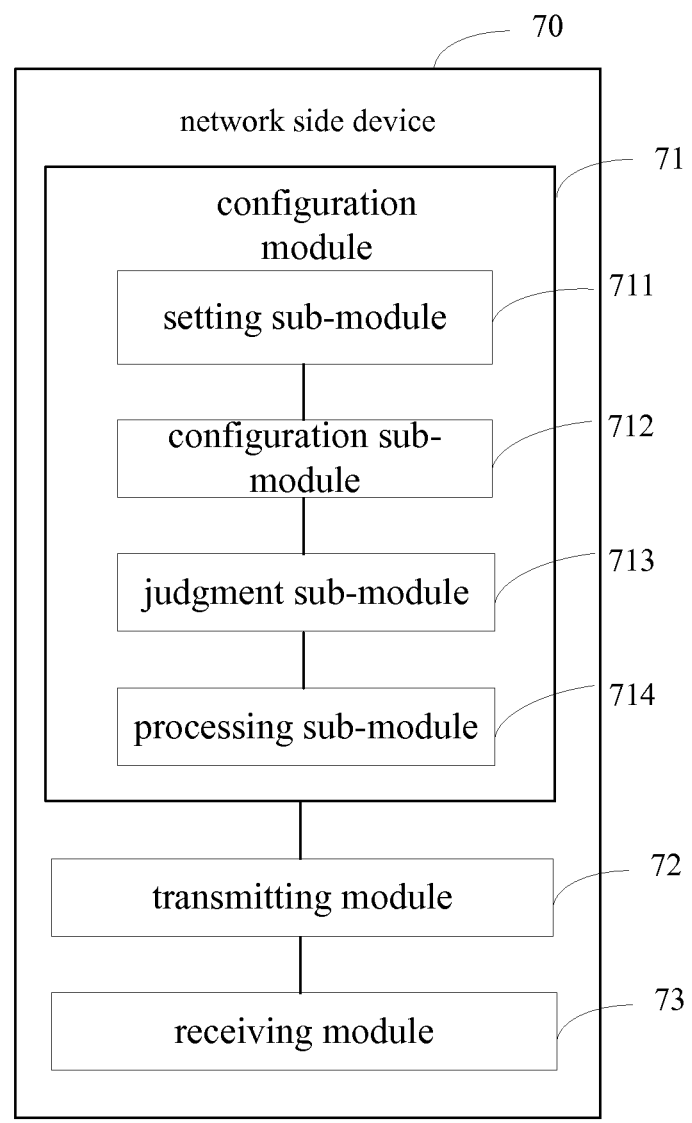
FIG. 7 is a structure diagram of a network device of Embodiment of the present invention.
Figure 8:
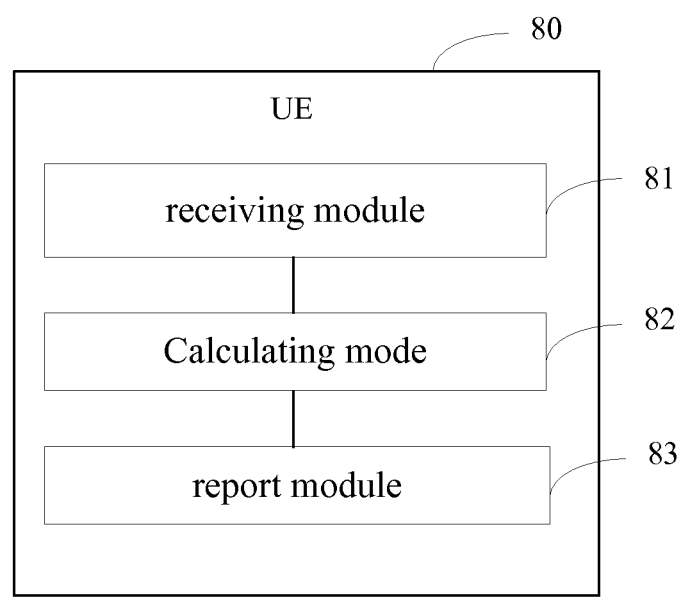
FIG. 8 is a structure diagram of a terminal of Embodiment of the present invention.

Embodiments of the present invention further provide a kind of network side device, like base station 70, as shown in FIG. 7, comprising:

Configuration module 71, which is used for configuring the uplink transmission mode of the UE, the transmission mode is transmission mode of the single carrier characteristics or the multicarrier characteristics; configuration module configures the uplink channel according to the channel quality information;

Transmitting module 72, which is used for transmitting the message carrying the uplink transmission mode reconfiguration to the UE when the uplink transmission mode configured by the configuration module 71 is different from the current transmission mode of the UE, which enables the UE to implement the uplink transmission using the uplink transmission mode, calculate the channel quality information according to the uplink transmission mode, and report it to the network side device;

Receiving module 73, use for receiving the channel quality information reported by the UE, and transmitting to the configuration module.

Configuration module 71, is used for configuring the uplink transmission mode of the single carrier characteristics for UE, or configuring the uplink transmission mode of the multicarrier characteristics for UE;

Including, the transmission mode of the signal carrier characteristics is that the UE uplink transmission of a sub-frame is PUSCH, or the UE uplink transmission of a sub-frame is PUCCH;

The transmission mode of the multicarrier characteristics is that the UE uplink transmission of a sub-frame is PUSCH, or the UE uplink transmission of a sub-frame is PUCCH, or the UE uplink transmission of a sub-frame is simultaneous transmission of PUSCH and PUCCH.

Before configuration module 71 configures the uplink transmission mode of UE, including:

The base station receive the channel quality information the UE reported; or

The base station completes the UE access.

Before configuration module 71 including:

Setting sub-module 711, used for setting to transmitting power headroom thresholds;

Configuration sub-module 712, configuring the uplink transmission mode according to the relationship of the power headroom of the UE uplink and the transmitting power headroom threshold the setting sub-module 711 set;

Judgment sub-module 713, to judge whether the uplink transmission mode configured by configuration sub-module 712 is the same as the current uplink transmission mode of the UE;

Processing sub-module 714, process according to the judgment of the judgment sub-module 713 judged.

Receiving module 81, used for receiving the signaling carrying uplink transmission mode from the base station, and using the transmission mode, the transmission mode is a transmission mode of the single carrier characteristics or the multicarrier characteristics;

Calculating module 82, used for calculating the channel quality information according to the uplink transmission mode the receiving module 81 received;

Report module 83, used for reporting it to the base station through the channel quality information the calculating module 82 calculated which enables the base station to configure the uplink channel according to the channel quality information.

Calculating module 82, comprising:

When the uplink transmission mode is a transmission mode of the single carrier characteristics, the calculating module82 calculates transmitting power headroom through the formula $PH(i)=P_{CMAX}-P_{PUSCH}(i)$, thereinto, $P_{CMAX}$ is the maximum allowed transmission power, $P_{PUSCH}(i)$ is the transmission power of PUSCH in the sub-frame i, PH(i) is the transmitting power headroom.

When the uplink transmission mode is a transmission mode of the multicarrier characteristics, the calculating module82 calculates transmitting power headroom through the formula $PH(i)=P_{CMAX}-P_{PUSCH}(i)-P_{PUCCH}(i)$, thereinto, $P_{CMAX}$ is the maximum allowed transmission power, $P_{PUSCH}(i)$ is the transmission power of PUSCH in the sub-frame i, $P_{PUCCH}$ is the transmission power of PUCCH in the sub-frame i, PH(i) is the transmitting power headroom.

Embodiments of the present invention is for power control according to different uplink transmission mode, thus realizes the uplink channel configuration the multicarrier transmitted in LTE-Advanced system. Of course, any product embodied the embodiments of the present invention is not necessary achieving all of the above advantages at the same time.

Through the description of the embodiments above, the technical personnel in this field can understand clearly that the present invention can be implemented by software and necessary current hardware platform. Of course can also through the hardware, but in many cases the former is better implementation ways. Based on this understanding, the technical program of the present invention or the part of contributing to the existing technology can be embodied by a form of software products which can be stored in storage medium, including a number of instructions for making a terminal device (such as mobile phone, personal computers, servers, or network equipments, etc.) implement the methods described in the embodiments of the present invention.

The descriptions above are just preferred implement ways of the present invention. It should be pointed that, for general technical personnel in this field, in not digress from the principle of the present invention premise, some improvement and decorating can be done, which should be as the protection scope of the present invention.

The invention claimed is:

1. An uplink channel configuration method, comprising:
receiving, by a terminal, information carrying an uplink transmission mode from a network side device, wherein the uplink transmission mode is an uplink transmission mode having single carrier characteristic or multi-carrier characteristic;
calculating, by the terminal, a transmitting power headroom according to the uplink transmission mode; and
reporting, by the terminal, the calculated transmitting power headroom to the network side device, which enables the network side device to configure a corresponding uplink channel according to the calculated transmitting power headroom,
wherein the uplink transmission mode having the single carrier characteristics is that the uplink transmission of the terminal in a sub-frame is Physical Uplink Shared Channel (PUSCH) transmission, or the uplink transmission of the terminal in a sub-frame is Physical Uplink Control Channel (PUCCH) transmission;
wherein the uplink transmission mode having the multi-carrier characteristics is that the uplink transmission of the terminal in a sub-frame is PUSCH transmission, or the uplink transmission of the terminal in a sub-frame is PUCCH transmission, or the uplink transmission of the terminal in a sub-frame is a simultaneous transmission of PUSCH and PUCCH;
wherein when the uplink transmission mode is a transmission mode having the single carrier characteristics, the terminal calculates the transmitting power headroom through a formula $PH(i)=P_{CMAX}-P_{PUSCH}^{(i)}$, where $P_{CMAX}$ is the allowed maximum transmission power of the terminal, $P_{PUSCH}$ (i) is the transmission power of PUSCH in the sub-frame i, and PH(i) is the transmitting power headroom for the sub-frame i; and
wherein when the uplink transmission mode is a transmission mode having the multi-carrier characteristics, the terminal calculates the transmitting power headroom through a formula $PH(i)=P_{CMAX}-P_{PUSCH}^{(i)}-P_{PUCCH}^{(i)}$, where $P_{CMAX}$ is the allowed maximum transmission power of the terminal, $P_{PUSCH}(i)$ is the transmission power of PUSCH in the sub-frame i, PPUCCH is the transmission power of PUCCH in the sub-frame i, and PH(i) is the transmitting power headroom for the sub-frame i.

2. An uplink channel configuration method, comprising:
configuring, by a network side device, an uplink transmission mode of a terminal as well as enabling the terminal to transmit uplink channels using the configured uplink transmission mode, so as to calculate a transmitting power headroom according to the configured uplink transmission mode and report the transmitting power headroom to the network side device, wherein the uplink transmission mode is an uplink transmission mode having single carrier characteristic or multi-carrier characteristic;
receiving, by the network side device, the transmitting power headroom reported by the terminal; and
configuring, by the network side device, the uplink channels according to the transmitting power headroom,
wherein the uplink transmission mode having the single carrier characteristics is that the uplink transmission of the terminal in a sub-frame is Physical Uplink Shared Channel (PUSCH) transmission, or the uplink transmission of the terminal in a sub-frame is Physical Uplink Control Channel (PUCCH) transmission;
wherein the uplink transmission mode having the multi-carrier characteristics is that the uplink transmission of the terminal in a sub-frame is PUSCH transmission, or the uplink transmission of the terminal in a sub-frame is PUCCH transmission, or the uplink transmission of the terminal in a sub-frame is a simultaneous transmission of PUSCH and PUCCH;
wherein when the uplink transmission mode is a transmission mode having the single carrier characteristics, the terminal calculates the transmitting power headroom through a formula $PH(i)=P_{CMAX}-P_{PUSCH}^{(i)}$, where $P_{CMAX}$ is the allowed maximum transmission power of the terminal, PUSCH (i) is the allowed transmission power of the terminal, $P_{PUSCH}(i)$ is the transmitting power of PUSCH in the sub-frame i, and PH (i) is the transmitting power headroom for the sub-frame i; and
wherein when the uplink transmission mode is a transmission mode having the multi-carrier characteristics, the terminal calculates the transmitting power headroom through a formula $PH(i)=P_{CMAX}-P_{PUSCH}^{(i)}-P_{PUCCH}^{(i)}$, where $P_{CMAX}$ is the maximum transmission power of the terminal, $P_{PUSCH}(i)$ is the transmission power of PUSCH in the sub-frame i, $P_{PUCCH}$ is the transmission power of PUCCH in the sub-frame i, and PH(i) is the transmitting power headroom for the sub-frame i.

3. The method according to claim 2, before the network side device configures an uplink transmission mode of a terminal, the method comprising:
receiving, by the network side device, the transmitting power headroom reported by the terminal; or
completing, by the network side device, the terminal accessing.

4. The method according to claim 2, wherein the configuring, by a network side device, an uplink transmission mode of a terminal comprises:
setting, by the network side device, a transmitting power headroom threshold;
configuring, by the network side device, the uplink transmission mode according to a relationship of the reported transmitting power headroom of the terminal and the transmitting power headroom thresholds;
judging, by the network side device, whether the uplink transmission mode is the same as a current uplink transmission mode used of the terminal; and
processing, by the network side device, according to the judging result.

5. A network side device, comprising:
a processor;
a memory, which is connected with the processor and stores program and data used when the processor executes; and
a transceiver, which communicates with other communication devices over a transmission medium,
wherein the network side device realizes the following processing, when the program and data stored in the memory are called and executed by the processor:
configuring an uplink transmission mode of a terminal as well as enabling the terminal to transmit uplink channels using the configured uplink transmission mode, so as to calculate a a transmitting power headroom according to the configured uplink transmission mode and report the transmitting power headroom to the network side device, wherein the uplink transmission mode is an uplink transmission mode having single carrier characteristic or multi-carrier characteristic;
receiving the transmitting power headroom reported by the terminal; and
configuring the uplink channels according to the transmitting power headroom, wherein the uplink transmission mode having the single carrier characteristics is that the uplink transmission of the terminal in a sub-frame is Physical Uplink Shared Channel (PUSCH) transmission, or the uplink transmission of the terminal in a sub-frame is Physical Uplink Control Channel (PUCCH) transmission;

wherein the uplink transmission mode having the multi-carrier characteristics is that the uplink transmission of the terminal in a sub-frame is PUSCH transmission, or the uplink transmission of the terminal in a sub-frame is PUCCH transmission, or the uplink transmission of the terminal in a sub-frame is a simultaneous transmission of PUSCH and PUCCH;

wherein when the uplink transmission mode is a transmission mode having the single carrier characteristics, the terminal calculates the transmitting power headroom through a formula $PH(i)=P_{CMAX}-P_{PUSCH}^{(i)}$, where $P_{CMAX}$ is the allowed maximum transmission power of the terminal, $P_{PUSCH}(i)$ is the transmission power of PUSCH in the sub-frame i, and $PH(i)$ is the transmitting power headroom for the sub-frame i; and wherein when the uplink transmission mode is a transmission mode having the multi-carrier characteristics, the terminal calculates the transmitting power headroom through a formula $PH(i)=P_{CMAX}-P_{PUSCH}^{(i)}-P_{PUCCH}^{(i)}$, where $P_{CMAX}$ is the maximum transmission power of the terminal, $P_{PUSCH}(i)$ is the transmission power of PUSCH in the sub-frame i, $P_{PUCCH}$ is the transmission power of PUCCH in the sub-frame i, and $PH(i)$ is the transmitting power headroom for the sub-frame i.

6. The network side device according to claim 5, wherein before the network side device configures an uplink transmission mode of a terminal,
the network side device receives the transmitting power headroom reported by the terminal; or
the network side device completes the terminal accessing.

7. The network side device according to claim 5, wherein the network side device is further configured for:
setting a transmitting power headroom thresholds;
configuring the uplink transmission mode according to a relationship between the reported transmitting power headroom of the terminal and the transmitting power headroom threshold;
judging whether the uplink transmission mode configured the network side device is the same as a current uplink transmission mode used by the terminal; and
processing according to a judging result made by the network side device.

8. A terminal, comprising:
a processor;
a memory, which is connected with the processor and stores program and data used when the processor executes; and
a transceiver, which communicates with other communication devices over a transmission medium,
wherein the terminal realizes the following processing, when the program and data stored in the memory are called and executed by the processor:
receiving information carrying an uplink transmission mode from a network side device, wherein the uplink transmission mode is an uplink transmission mode having single carrier characteristic or multi-carrier characteristic;
calculating a transmitting power headroom according to the uplink transmission mode; and
reporting the calculated transmitting power headroom to the network side device, which enables the network side device to configure a corresponding uplink channel according to the calculated transmitting power headroom, wherein the uplink transmission mode having the single carrier characteristics is that the uplink transmission of the terminal in a sub-frame is Physical Uplink Shared Channel (PUSCH) transmission, or the uplink transmission of the terminal in a sub-frame is Physical Uplink Control Channel (PUCCH) transmission;

wherein the uplink transmission mode having the multi-carrier characteristics is that the uplink transmission of the terminal in a sub-frame is PUSCH transmission, or the uplink transmission of the terminal in a sub-frame is PUCCH transmission, or the uplink transmission of the terminal in a sub-frame is a simultaneous transmission of PUSCH and PUCCH;

wherein when the uplink transmission mode is a transmission mode having the single carrier characteristics, the terminal calculates the transmitting power headroom through a formula $PH(i)=P_{CMAX}-P_{PUSCH}^{(i)}$, where $P_{CMAX}$ is the allowed maximum transmission power of the terminal, $P_{PUSCH}(i)$ is the transmission power of PUSCH in the sub-frame i, and $PH(i)$ is the transmitting power headroom for the sub-frame i; and wherein when the uplink transmission mode is a transmission mode having the multi-carrier characteristics, the terminal calculates the transmitting power headroom through a formula $PH(i)=P_{CMAX}-P_{PUSCH}^{(i)}-P_{PUCCH}^{(i)}$, where $P_{CMAX}$ is the maximum transmission power of the terminal, $P_{PUSCH}(i)$ is the transmission power of PUSCH in the sub-frame i, $P_{PUCCH}$ is the transmission power of PUCCH in the sub-frame i, and $PH(i)$ is the transmitting power headroom for the sub-frame i.

* * * * *